(12) United States Patent
Gkountaras (10) Patent No.: US 12,372,059 B2
(45) Date of Patent: Jul. 29, 2025

(54) WIND ENERGY PLANT

(71) Applicant: Siemens Gamesa Renewable Energy A/S, Brande (DK)

(72) Inventor: Aris Gkountaras, Berlin (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/726,518

(22) PCT Filed: Jan. 5, 2023

(86) PCT No.: PCT/EP2023/050138
§ 371 (c)(1),
(2) Date: Jul. 3, 2024

(87) PCT Pub. No.: WO2023/131630
PCT Pub. Date: Jul. 13, 2023

(65) Prior Publication Data
US 2025/0067246 A1    Feb. 27, 2025

(30) Foreign Application Priority Data
Jan. 7, 2022    (EP) .................................. 22150544

(51) Int. Cl.
*F03D 7/04*    (2006.01)
*F03D 7/02*    (2006.01)
(Continued)

(52) U.S. Cl.
CPC ........... *F03D 7/048* (2013.01); *F03D 7/0284* (2013.01); *H02J 3/32* (2013.01); *H02J 3/46* (2013.01);
(Continued)

(58) Field of Classification Search
CPC .......... F03D 7/048; F03D 7/0284; H02J 3/32; H02J 3/46; H02J 2300/28; H02J 3/48;
(Continued)

(56) References Cited

U.S. PATENT DOCUMENTS

| 2011/0137481 A1 | 6/2011 | Manz et al. |
| 2015/0137519 A1 | 5/2015 | Tarnowski |

(Continued)

FOREIGN PATENT DOCUMENTS

| EP | 2139090 A1 | 12/2009 |
| EP | 2733810 A2 | 5/2014 |

(Continued)

OTHER PUBLICATIONS

PCT International Search Report and Written Opinion of International Searching Authority mailed Mar. 27, 2023 corresponding to PCT International Application No. PCT/EP2023/050138 filed Jan. 5, 2023.

(Continued)

*Primary Examiner* — Joseph Ortega
(74) *Attorney, Agent, or Firm* — Schmeiser, Olsen & Watts LLP (57) ABSTRACT

A wind energy plant is provided including a plurality of wind turbines and committed to provide a specified quantity of active power over a specified duration in response to a grid under-frequency event, characterized by a plurality of power storage devices, wherein the rated storage capacity of the plurality of power storage devices corresponds to the specified quantity of active power; and wherein the wind energy plant is configured to deliver an active power deficit ($\Delta P10S$) when the stored power available in the power storage devices is less than the rated storage capacity at the time of occurrence of a grid under-frequency event.

15 Claims, 6 Drawing Sheets

(51) Int. Cl.
*H02J 3/32* (2006.01)
*H02J 3/46* (2006.01)

(52) U.S. Cl.
CPC . *F05B 2270/1033* (2013.01); *F05B 2270/337* (2013.01); *H02J 2300/28* (2020.01)

(58) Field of Classification Search
CPC .............. H02J 3/381; F05B 2270/1033; F05B 2270/337; Y02E 10/72; Y02E 70/30
See application file for complete search history.

(56) References Cited

U.S. PATENT DOCUMENTS

| | | |
|---|---|---|
| 2015/0381089 A1 | 12/2015 | Tarnowski et al. |
| 2018/0195495 A1* | 7/2018 | Williams .................. H02J 3/32 |
| 2020/0400120 A1* | 12/2020 | Brogan .................... H02J 11/00 |

FOREIGN PATENT DOCUMENTS

| | | |
|---|---|---|
| EP | 2733812 A2 | 5/2014 |
| EP | 2884096 A1 | 6/2015 |
| EP | 3823125 A1 | 5/2021 |
| WO | 2018145801 A1 | 8/2018 |
| WO | 2020125883 A1 | 6/2020 |
| WO | 2021058070 A1 | 4/2021 |
| WO | 2021249603 A1 | 12/2021 |

OTHER PUBLICATIONS

Barote L et al: "Stand-alone wind system with Vanadium Redox Battery energy storage"; Optimization of Electrical and Electronic Equipment; 2008. OPTIM 2008. 11th International Conference on; IEEE; Piscataway; NJ; USA; May 22, 2008 (May 22, 2008); pp. 407-412; XP031341240; ISBN: 978-1-4244-1544-1.

* cited by examiner

WIND ENERGY PLANT

CROSS-REFERENCE TO RELATED APPLICATIONS

This application is a national stage of PCT Application No. PCT/EP2023/050138, having a filing date of Jan. 5, 2023, which claims priority to European Application No. 22150544.9, having a filing date of Jan. 7, 2022, the entire contents both of which are hereby incorporated by reference.

FIELD OF TECHNOLOGY

The following relates to a wind energy plant.

BACKGROUND

An electricity grid distributes power provided by various power generation plants to the consumers of electricity. Base load power generation plants that burn fossil fuels are being phased out and replaced by power generation plants that convert renewable energy sources to electricity. An example of such a "renewable" power generation plant is a wind farm. Any power generation plant is generally required to fulfil certain regulations in order to contribute to grid stability. It is important to maintain the grid frequency at an essentially constant value, for example 50 Hz in Europe. However, a sudden increase in load can result in a noticeable drop in grid frequency, generally referred to as a grid under-frequency event. The grid operator must ensure that the grid frequency quickly returns to normal. For this reason, a mode of frequency response can be agreed between the grid operator and the operator of a power generation plant. For example, in exchange for remuneration, the operator of a wind energy plant may commit to delivery of a certain quantity of active power for a certain duration following a grid under-frequency event. This commitment to provide the agreed quantity of active power may be a permanent arrangement or may remain valid for a contractually agreed time.

However, because of the fluctuating nature of wind and the unpredictability of grid under-frequency events, it is essentially impossible for the operator of a prior art wind energy plant to predict with any certainty the quantity of active power that can be delivered in response to a grid under-frequency event that might occur at any time in the future. In one approach, as proposed in EP2733812A2, a separate or stand-alone power storage facility can be controlled to store power which can be released as required to assist in responding to an under-frequency event. However, since a power storage facility deteriorates over time, the operator of the wind energy plant may be unable to fulfil the contractual obligation.

It is known to curtail the output power of variable-speed wind turbines of a wind park so that, if necessary, the wind turbines can increase their output power in order to respond to a grid under-frequency event. An example of this approach is given in WO2021249603A1. Typically, the output power of such a wind park might be curtailed to 80% of rated power output, i.e. the wind turbines are operated to generate 20% less output power than is possible. However, curtailing the output power means that the wind park is never exporting as much electricity as it could, and the revenue is less than what it could be. The loss of potential revenue may outweigh the remuneration in exchange for commitment to provide an agreed amount of active power. Furthermore, in order to fulfil normal grid demand, a "curtailed" wind farm may require a larger number of wind turbines, which further increases the cost of energy (CoE).

SUMMARY

An aspect relates to a wind energy plant that overcomes the problems outlined above.

According to embodiments of the invention, the wind energy plant comprises a plurality of wind turbines and is committed to providing a specified quantity of active power over a specified duration in response to a grid under-frequency event. The wind energy plant is characterized by a plurality of power storage devices, and each power storage device is arranged in a wind turbine of the wind energy plant. The rated storage capacity of the plurality of power storage devices is at least as large as the specified quantity of active power. The wind energy plant is configured to deliver an active power deficit when the collective stored power available in the power storage devices is less than the rated storage capacity at the time of occurrence of a grid under-frequency event.

The specified quantity of active power can have been stipulated or agreed at a previous stage. It shall be understood that the agreed quantity of primary reserve power is a contractual obligation on the part of the plant operator. The wind energy plant must then deliver the agreed amount of active power (the "primary reserve") for the specified duration in order to honor the commitment. The grid operator can remunerate the park operator for undertaking to commit to the provision of primary reserve. The timespan during which the primary reserve power is to be provided following a grid under-frequency event may also be referred to as the "event response duration" in the following.

An advantage of such wind energy plant is that it is set up to provide an agreed amount of active power following a grid under-frequency event but does not need to always operate the wind turbines at curtailed output power in order to be able to deliver the primary reserve. Instead, a configuration of power storage devices is provided with a total rated capacity that is at least as large as the agreed primary reserve. Following a grid under-frequency event, the power storage devices feed their stored power into the grid. If, at the time of a grid under-frequency event, the power storage devices collectively store less than the rated capacity, the wind energy plant reacts by controlling the wind turbines in one of several ways so that the deficit can be made up.

According to embodiments of the invention, the method of operating such a wind energy plant comprises the steps of determining the actual stored power available in the power storage devices: computing the active power deficit between the actual stored power and the rated storage capacity of the power storage devices: feeding the stored power from the power storage devices to the grid: and operating the wind turbines to deliver the active power deficit.

In the following, it may be assumed that the wind energy plant comprises many wind turbines and can contribute significantly to the stability of the grid into which it feeds. For example, a wind energy plant may comprise several hundred wind turbines. Of course, embodiments of the invention applies equally to smaller wind energy plants.

It may be assumed that the wind energy plant is controlled by a park controller that performs various functions, for example a park controller issues control commands in response to the fluctuating grid requirements. In the wind energy plant, the park controller comprises a frequency response module configured to identify an optimum way of delivering the agreed primary reserve, as will be explained in the following. In the following, the terms "frequency response module" and "frequency response controller" are regarded as synonyms and may be used interchangeably.

It may also be assumed that each wind turbine has a local wind turbine controller which receives power setpoints from the park controller, and which generates local control commands accordingly.

The number of power storage devices deployed throughout the wind energy plant may be determined on the basis of the agreed primary reserve. Equally, the agreed quantity of primary reserve may be determined based on the number of power storage devices deployed throughout the wind energy plant.

The power storage device of a wind turbine is configured to discharge into the grid in response to a grid under-frequency event, for example in response to a command from the wind turbine controller or from a controller of the wind energy plant.

The power storage device of a wind turbine is configured to be charged by its wind turbine during normal grid conditions. In other words, when the grid is stable, electricity generated by the wind turbine is used to charge the power storage device and to maintain the fully-charged state of the power storage device.

In the following, without restricting embodiments of the invention in any way, the power storage device of a wind turbine may be assumed to be a battery arrangement comprising one or more batteries connected in any suitable manner. The terms "power storage device", "battery arrangement" and "battery" may be used interchangeably. Since the batteries are distributed between the wind turbines of the wind energy plant, they may be referred to collectively as a distributed storage arrangement. Of course, the distributed storage arrangement can comprise various types of power storage devices.

As mentioned above, as long as all batteries are in good health and the total stored battery power is the same as the rated battery power, the batteries can collectively deliver the agreed primary response following a grid under-frequency event. However, power storage devices such as batteries do not have an unlimited lifetime and their performance can deteriorate over time. Therefore, sooner or later, the total stored battery power will no longer reach the rated level. The wind energy plant must then make up this deficit in another way.

In an embodiment of the invention, during normal operation of the wind energy plant, the frequency response module observes the health of the distributed storage arrangement and identifies a deficit, for example a diminishing capacity owing to wear and tear or owing to a fault in a battery: The frequency response module may then issue power setpoints that effectively curtail the output power of one or more wind turbines based on the discrepancy between the actual storage capacity of the batteries and the rated storage capacity. Then, should a grid under-frequency event occur, the curtailed wind turbines will be able to release their spinning reserve to augment the power released from the batteries. In combination, the battery power and the spinning reserve deliver the agreed amount of active power.

In an embodiment of the invention, the wind energy plant comprises a monitoring means that can monitor the health of the power storage devices so that a deficit can be identified ahead of a grid under-frequency event. For example, a monitoring means may observe the charging cycles of the batteries and can identify any deterioration in performance. The monitoring means can be realized by providing each battery with appropriate voltage and/or current measuring devices, and a communicating the measurements to the local wind turbine controller or to the park controller.

In an embodiment of the invention, the primary reserve can be re-negotiated as the storage capacity of the power storage devices deteriorates over time. For example, the revenue that may be earned by not curtailing the wind turbines further may outweigh the remuneration for commitment to provide primary reserve above the basic minimum.

Depending on various unpredictable factors, a situation may arise in which the batteries are unable to collectively deliver the required power in response to an under-frequency event. Therefore, as explained above, the wind energy plant controller can curtail the output power of the wind turbines to some extent during normal grid conditions. In the event of a grid under-frequency event, the wind energy plant will then be able to avail of a quantity of spinning reserve to "top up" the battery output power. The power stored as spinning reserve can be released, i.e. fed into the grid, when the batteries are depleted.

The following describes an exemplary embodiment of the invention. A wind energy plant comprises ten wind turbines, each with a rated power of 10 MW, so that the wind energy plant has a rated power of 100 MW. Each wind turbine is equipped with a storage element, and each of the ten storage elements has a rated capacity of 1 MW, i.e. each storage element can store 1 MW of power. The wind energy plant is committed to providing up to 8 MW of additional active power during frequency response, for a duration of up to 30 minutes.

At some point in time $t_0$, a grid under-frequency event occurs, and the wind farm must deliver the agreed active power $P_{FR}$. The park controller determines the available power being generated by the wind turbines, the power stored in the batteries, and the wind conditions in the near future. In this simple example, each of the ten wind turbines is generating 9 MW at time $t_0$, and each of the ten batteries can provide 0.5 MW. Therefore, at time to, the batteries can collectively provide 5 MW, leaving a deficit of 3 MW for the wind energy plant to provide. The park controller forecasts that during the specified response time $t_{FR}$, the wind turbines can be operated at their rated power. In other words, the wind turbines can be controlled to increase their output power as the batteries are being depleted. Once the batteries are depleted, the "missing" 3 MW will then be provided by the wind energy plant spinning reserve. To this end, appropriate setpoints are issued to the ten wind turbines depending on their individual forecasts in order to distribute the 3 MW according to their capabilities.

In this simple example, the ten wind turbines are collectively generating 85 MW at time $t_0$, and the ten batteries collectively store 5 MW. Therefore, at time $t_0$, there is a deficit of 3 MW for the wind energy plant to provide. The park controller forecasts that during the specified response time $t_{FR}$, the wind turbines can be operated at their rated power. In other words, the wind turbines can be controlled to increase their output power as the batteries are being depleted. Once the batteries are depleted, the "missing" 3 MW will then be provided by the wind energy plant spinning reserve. To this end, appropriate setpoints are issued to the ten wind turbines depending on their individual forecasts in order to distribute the 3 MW according to their capabilities.

During normal operation of the wind energy plant, the power storage devices are in standby, ready to deliver active power if required in response to a grid under-frequency event. However, the power available in the batteries may also be needed for other purposes. For example, the power available in the power storage device of a wind turbine may be used to power up that wind turbine during low-wind conditions following a shut-down duration. As soon as the wind speed increases, the wind turbine resumes generating power, some of which is used for its auxiliary devices, and some of which is used to recharge the power storage device.

During a grid under-frequency event, as much active power as possible should be fed into the grid. Therefore, in another approach to ensuring delivery of the agreed primary reserve, the method comprises a step of reducing the power consumption of the auxiliaries of the wind turbines. In this way, during a grid under-frequency event, the frequency response controller can reduce the power consumption of one or more such devices so that as much active power as possible can be fed into the grid. The power consumption of these devices returns to normal after the specified event response duration has completed. It shall be assumed that the frequency response controller assesses the feasibility of such load reduction, for example the motors, fans, pumps etc. of a cooling arrangement will only be operated at lower power if critical temperatures (e.g. the generator temperature) are within safe levels.

Power transported through a cable generally undergoes some loss, depending on parameters such as cable length and conductor cross-sectional area. The cables connecting the various wind turbines of a large wind park to a point of common connection (PCC) can have significantly different lengths, depending on how the wind turbines are distributed throughout the wind park. For example, a wind turbine that is far away from the PCC in a wind park may be associated with 5% cable losses, compared to only 1% cable losses for a wind turbine that is closer to the PCC. Therefore, in an embodiment of the invention, the frequency response controller is provided with information regarding the cable layout of the wind park and distributes the power setpoints to the wind turbines according to their cable connection lengths to the PCC. In this way, the uneven distribution of setpoints can minimize cable losses in order to ensure that as much active power can be fed into the grid following an under-frequency event, while at the same time ensuring that the wind turbines are curtailed by a favorable minimum during normal operation. For example, in a large offshore wind park, the frequency response controller may choose to curtail any "near" wind turbines to a greater extent than the more "remote" wind turbines, i.e. a wind turbine with a shorter cable connection to the PCC can be curtailed to a greater extent than a wind turbine with a longer cable to the PCC. Following a grid under-frequency event, the more severely curtailed "closer" wind turbines can immediately increase their output to the rated level, and only a small fraction of the resulting active power is lost through the shorter cable connections. The more remote wind turbines are curtailed less during normal operation to counteract the larger cable losses.

Similarly, if a power storage device of a "remote" wind turbine becomes faulty, the frequency response controller may respond to counteract the ensuing deficit by increasing the curtailment of a "near" wind turbine in order to be able to compensate for the overall reduction in storage capacity.

BRIEF DESCRIPTION

Some of the embodiments will be described in detail, with references to the following Figures, wherein like designations denote like members, wherein.

DETAILED DESCRIPTION

Figure 1:
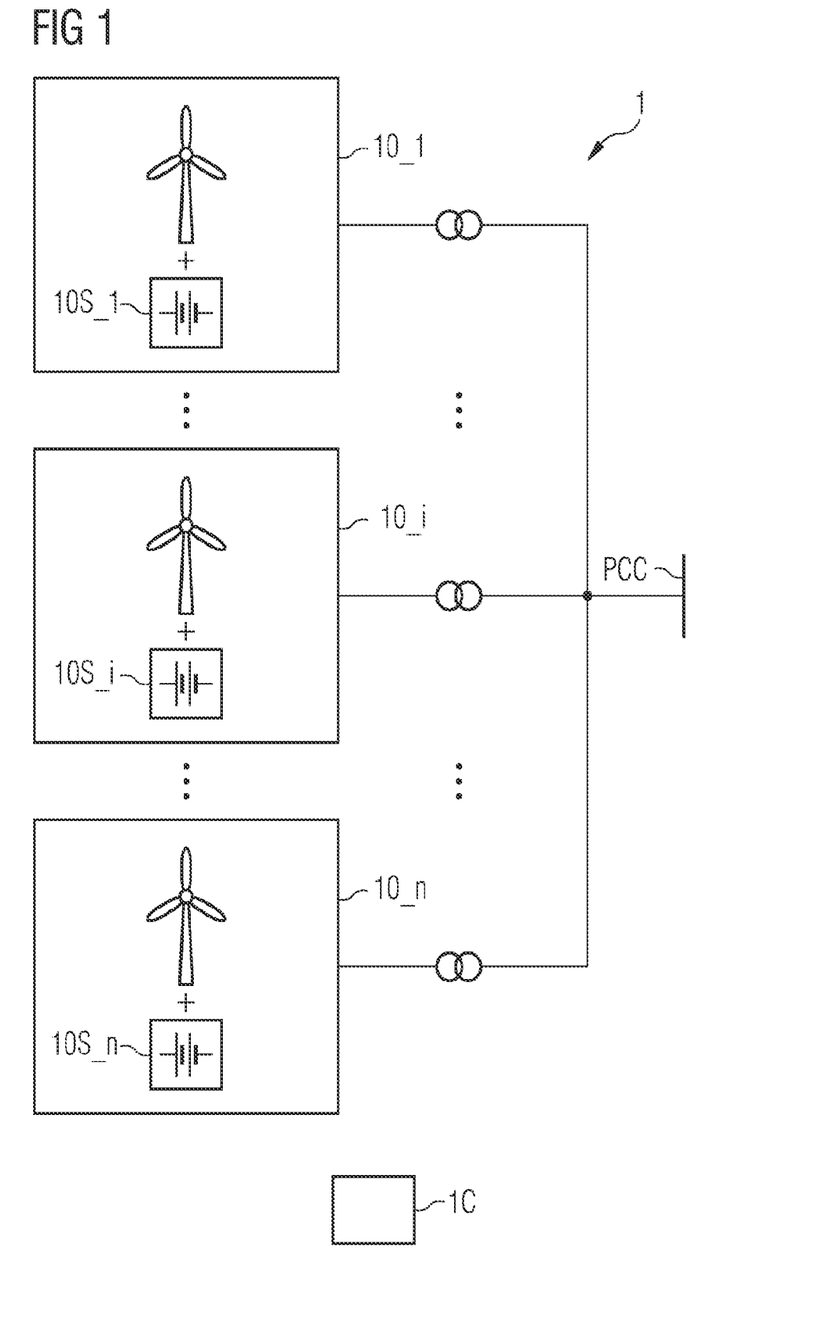
FIG. 1 shows an exemplary embodiment of a wind energy plant.

FIG. 1 shows an exemplary embodiment of a wind energy plant 1 or wind park 1. The wind energy plant 1 may comprise a plurality of wind turbines $10\_1, \ldots, 10\_n$ that export power to a grid, represented herein by a point of common connection (PCC). The diagram shows a wind park controller 1C or wind park operation center, which may be local to the wind park 1 or at a remote location. Each wind turbine $10\_1, \ldots, 10\_n$ may be equipped with a power storage device $10S\_1, \ldots, 10S\_n$. Since the power storage devices $10S\_1, \ldots, 10S\_n$ may be distributed over the wind park 1, they may be referred to collectively as a distributed storage arrangement. The total rated capacity of the power storage devices $10S\_1, \ldots, 10S\_n$, i.e. the capacity of the distributed storage arrangement, may be at least as large as a power reserve $P_{FR}$ agreed between the grid operator and the wind park operator:

$$P10S_{rated} \geq P_{FR} \qquad (1)$$

Figure 2:
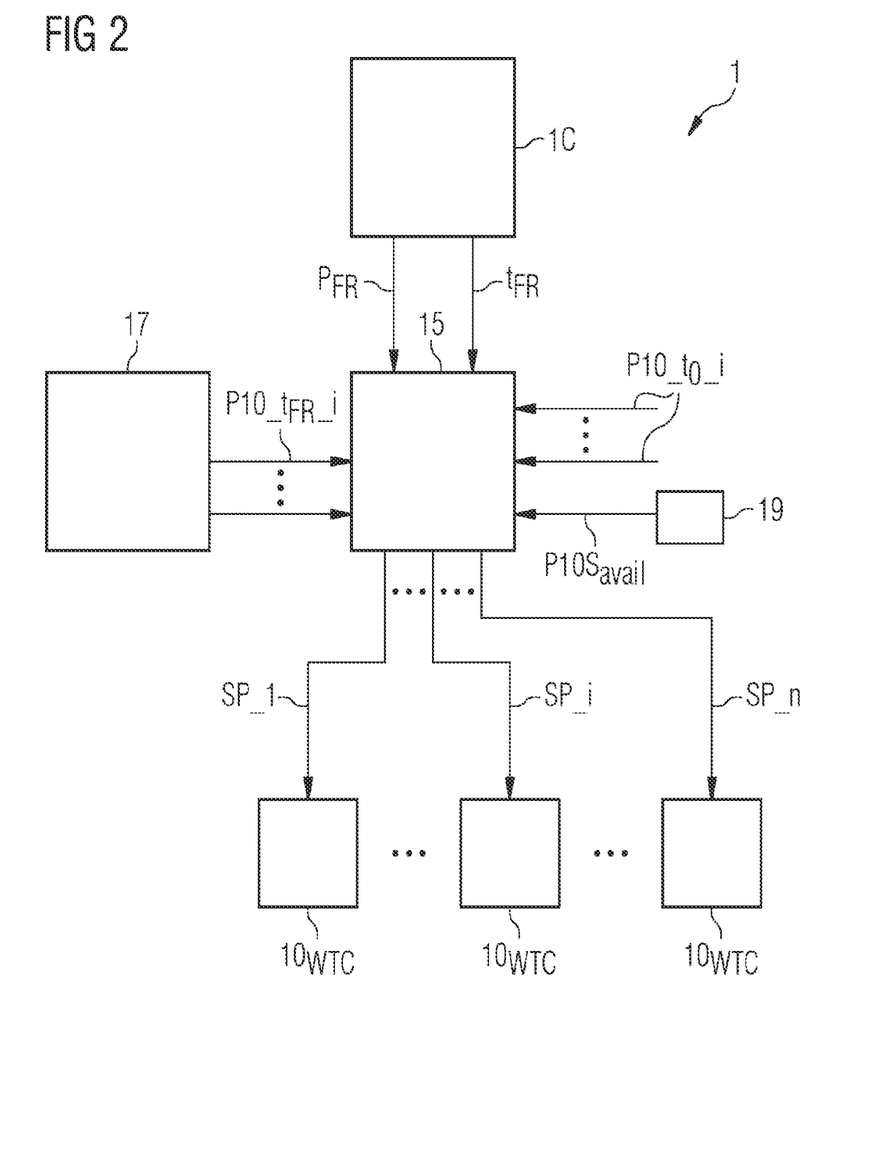
FIG. 2 is a block diagram to illustrate control of the wind energy plant of FIG. 1.

FIG. 2 is a block diagram to illustrate control of the wind park 1 of the example of FIG. 1. The operation center IC may inform a frequency response controller 15 of the agreed active power $P_{FR}$ to be supplied during frequency response, and the agreed duration $t_{FR}$. In the event of a grid under-frequency event at time $t_0$, the frequency response controller 15 may be provided with at least the following inputs: the present power output $P10\_t_0\_i$ of each wind turbine, the forecast or projected power output $P10\_t_{FR}\_i$ that could be achieved by each wind turbine $10\_1, \ldots, 10\_n$ during the response duration $t_{FR}$, and the power $P10S_{avail}$ available in the batteries $10S\_1, \ldots, 10S\_n$ of the distributed storage arrangement at time $t_0$.

The present power output $P10\_t_0\_i$ of each wind turbine $10\_1, \ldots, 10\_n$ is known by the wind park controller 1C. The power output $P10\_t_{FR}\_i$ that could be achieved by each wind turbine $10\_1, \ldots, 10\_n$ may be determined by a forecasting module 17.

The total power $P10S_{avail}$ available in the batteries $10S\_1, \ldots, 10S\_n$ of the distributed storage arrangement may be determined from a battery monitoring means 19 that monitors the charging cycles of a battery $10S\_1, \ldots, 10S\_n$. Each wind turbine $10\_1, \ldots, 10\_n$ of the wind park 1 may have its own battery monitoring means 19, or a single battery monitoring means 19 may monitor all batteries $10S\_1, \ldots, 10S\_n$ of the wind park 1.

If the batteries of the distributed storage arrangement are all healthy and fully charged at time to, satisfying equation (1), the frequency response controller 15 may issue commands to commence discharging the batteries $10S\_1, \ldots,$ 10S_n, and the wind energy plant 1 will have honored its commitment by the end of the response time $t_{FR}$.

However, if the batteries 10S_1, ..., 10S_n are not fully charged at time $t_0$, i.e. the available power $P10S_{avail}$ stored in the batteries is less than the rated storage capacity $P10S_{rated}$, the frequency response controller 15 may respond in an appropriate manner in order to ensure that the wind energy plant 1 can honor its commitment to deliver the agreed quantity of active power $P_{FR}$. To this end, the frequency response controller 15 may determine the power deficit:

$$\Delta P10S = P10S_{rated} - P10S_{avail} \quad (2)$$

The frequency response controller 15 then may determine how to control the wind turbines 10_1, ..., 10_n so that the spinning reserve of one or more wind turbines 10_1, ..., 10_n makes up the deficit $\Delta P10S$. The frequency response controller 15 may then issue appropriate setpoints SP_1, ..., SP_n to the wind turbine controllers $10_{WTC}$ of the wind turbines 10_1, ..., 10_n. The setpoints SP_1, ..., SP_n may be scheduled so that the spinning reserve provided by the wind turbines 10_1, ..., 10_n is timed to optimally augment the active power being released by the discharging batteries 10S_1, ..., 10S_n.

In addition to the functionality described in FIG. 2 above, the frequency response controller 15 may assess the impact of activating inertial response of each wind turbine $10_i$, and may activate or deactivate this feature as a result of the assessment. As a result, the setpoints SP_1, ..., SP_n issued by the wind turbine controllers $10_{WTC}$ will enable the release of spinning reserve of some wind turbines and disable the release of spinning reserve of the remaining wind turbines. This is illustrated in FIG. 3, in which setpoints SP_1, SP_j that result in the release of spinning reserve are indicated by solid lines, and setpoints SP_i, SP_n that do not result in the release of spinning reserve are indicated by dotted lines.

Figure 3:
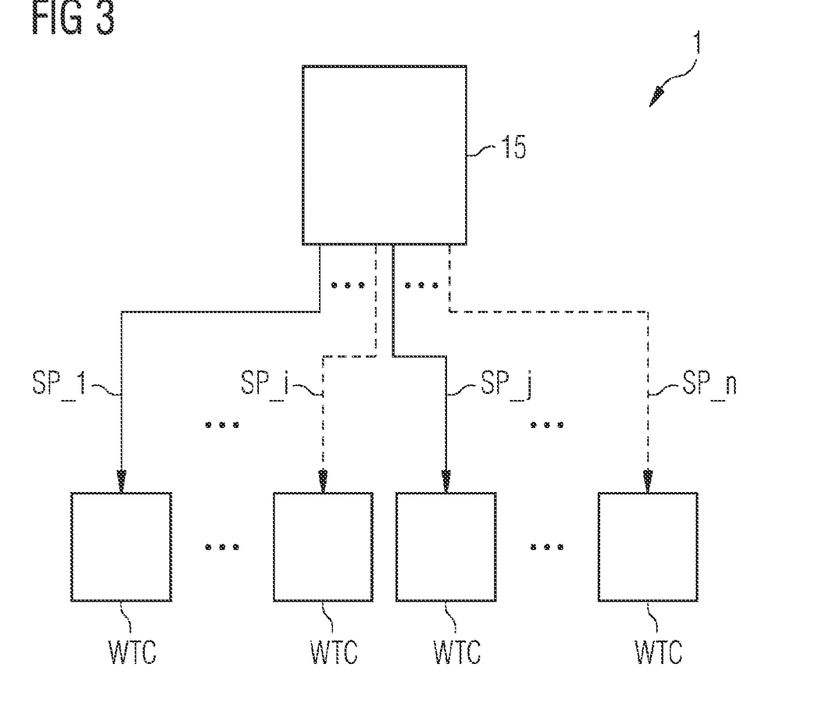
FIG. 3 illustrates an embodiment of the invention.
Figure 4:
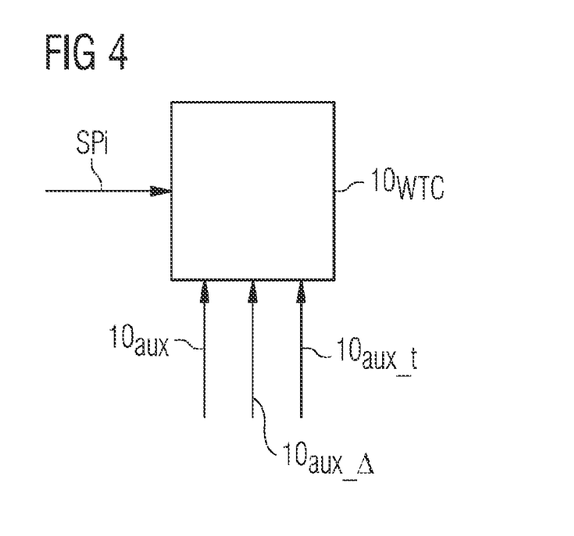
FIG. 4 illustrates an embodiment of the invention.

In addition to the functionality described in FIG. 3 above, the frequency response controller 15 may determine whether it is expedient to reduce the power consumption of auxiliary loads in the wind turbines. For example, if it seems that the available stored power $P10S_{avail}$ and the projected wind power $P10_{t_{FR}\_i}$ may be unable to provide the entire primary reserve $P_{FR}$ over the agreed duration $t_{FR}$, the frequency response controller 15 may command a temporary reduction in power consumed by motors, pumps etc. of a certain auxiliary device such as the cooling systems of one or more wind turbines. For example, as indicated in FIG. 4, the frequency response controller 15 may assess the impact of reducing the consumption of specific auxiliary systems of one or more wind turbines and then may communicate to the relevant wind turbine(s) the auxiliary device(s) $10_{aux}$ to be regulated, the amount $10_{aux\_A}$ by which power is to be reduced, and the duration $10_{aux\_t}$. The power that is "borrowed" from the auxiliaries for a short time can help fulfil the commitment to deliver the agreed amount of active power $P_{FR}$.

Figure 5:
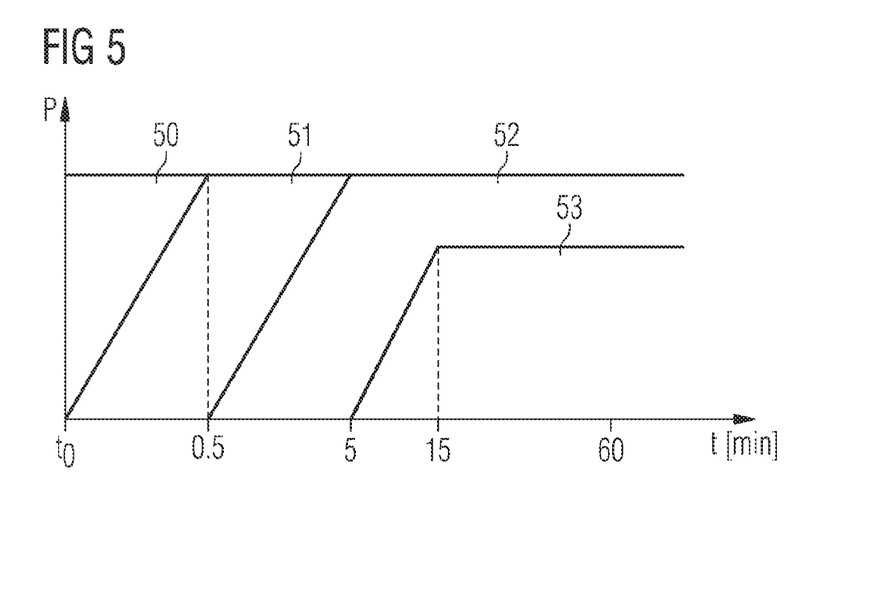
FIG. 5 illustrates ancillary services related to frequency response.

FIG. 5 illustrates various types of ancillary services related to frequency response. The diagram indicates the total power from various power generation plants being fed into a grid following a grid under-frequency event at time $t_0$. Depending on the capabilities of the power generation plants, these provide inertial response 50, primary response 51, secondary response 52 or tertiary response 54. These services 50, 51, 52, 53 are delivered in chronological order, i.e. inertial response 50 and primary response 51 can be delivered essentially immediately. Secondary response 52 is delivered if primary response 51 failed to stabilize the grid. Similarly, tertiary response 53 is delivered if secondary response 52 was insufficient to stabilize the grid. A wind park is generally only able to provide some inertial response 50 (by releasing kinetic energy of the aerodynamic rotors) and some primary response 51 (from spinning reserve). In embodiments, the method is concerned with a way of ensuring that a wind energy plant 1 can honor a commitment to provide a set amount of primary reserve while avoiding the revenue sacrifice attendant with a prior art approach of curtailed operation.

Figure 6:
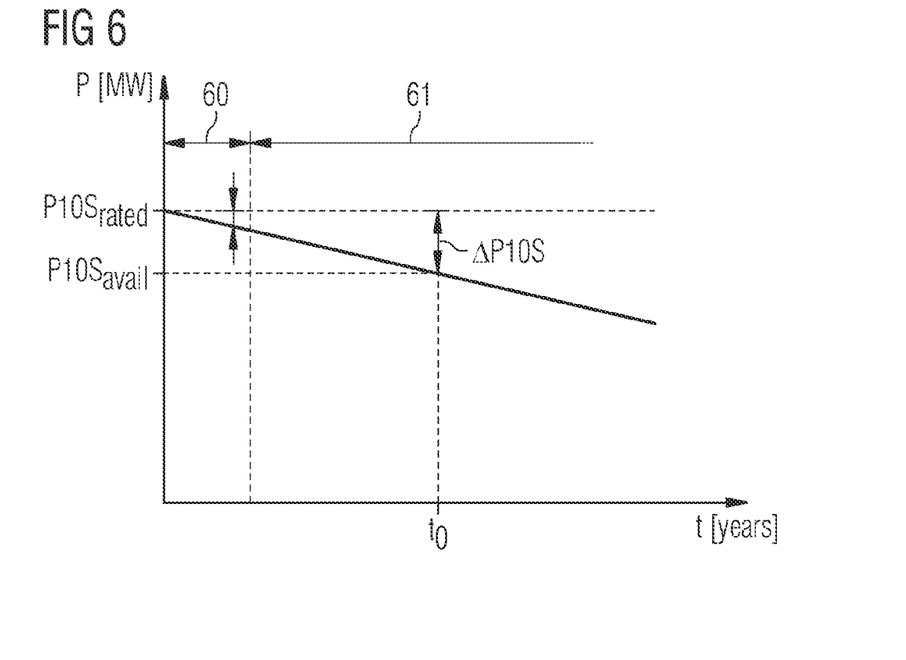
FIG. 6 illustrates the effect of deteriorating battery capacity.

As long as the batteries 10S_1, ..., 10S_n of the wind energy plant 1 are fully charged, the wind turbines can operate at rated power output and need not be curtailed. In the event of a grid under-frequency event, the batteries can provide the entire quantity of agreed primary reserve $P_{FR}$. As the batteries deteriorate over time and lose capacity, the wind turbines can be curtailed by an amount to make up for the deficit in stored battery power. FIG. 6 illustrates the effect of deteriorating battery capacity during the lifetime of the wind energy plant. Initially, the distributed batteries have a rated capacity $P10S_{rated}$ that is at least as large as the agreed primary reserve $P_{FR}$. The health of the batteries declines over time. During an initial phase 60, the discrepancy between rated capacity $P10S_{rated}$ and primary reserve $P_{FR}$ may be small, and it may be possible to make up the difference by reducing the load on the batteries of the wind turbines during the response time $t_{FR}$ following a drop in grid frequency. Sooner or later, during a subsequent phase 61, the collective storage capacity may deteriorate to a point at which a more effective remedy is required to make up the difference between the rated capacity $P10S_{rated}$ and the primary reserve $P_{FR}$. The frequency response module will then react by curtailing the power output of a suitable number of wind turbines so that, in the event of a grid under-frequency, it can then issue setpoints to release the spinning reserve of those wind turbines.

Figure 7:
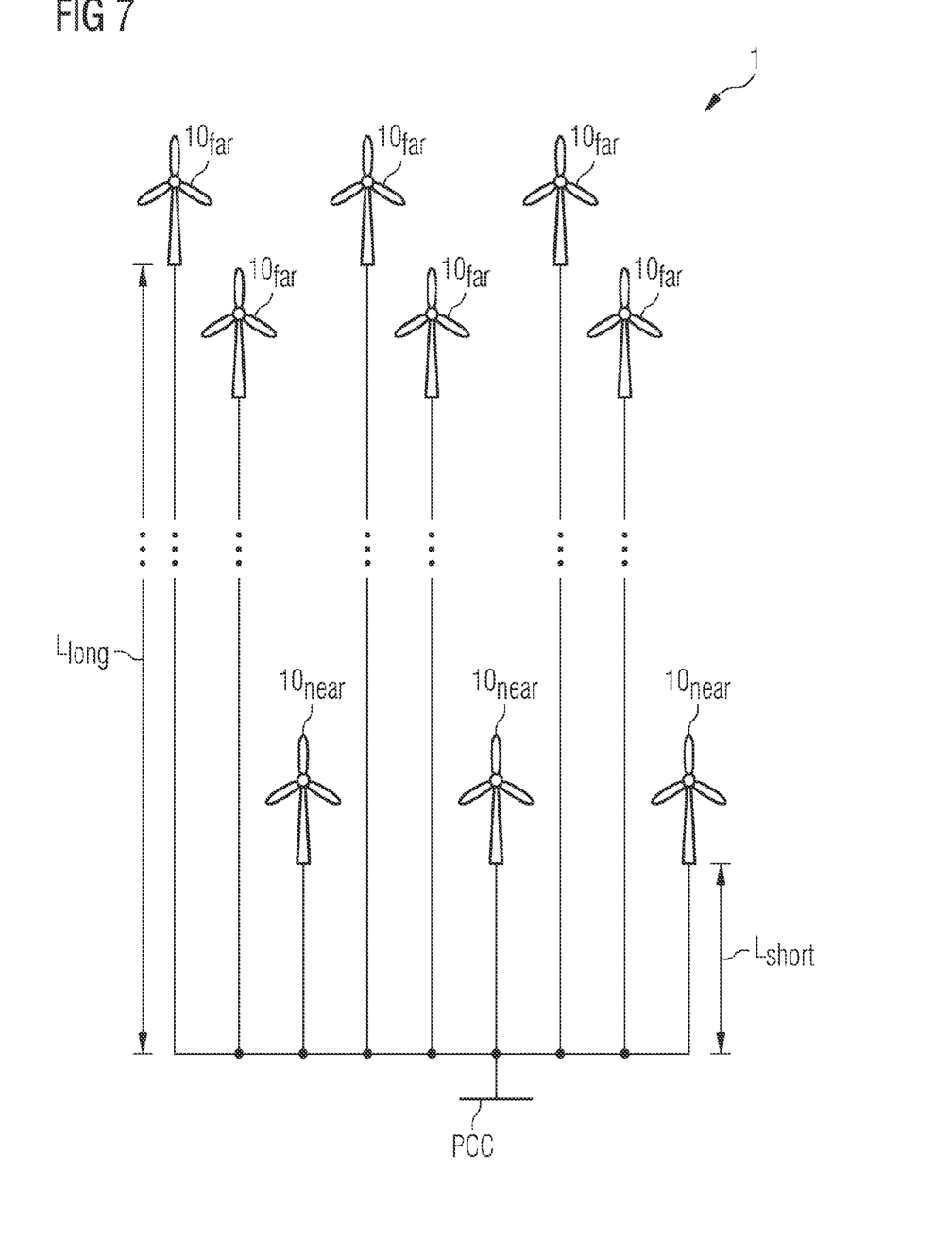
FIG. 7 illustrates a further embodiment of the invention.

FIG. 7 shows an exemplary embodiment of a wind park 1 with many wind turbines. Some wind turbines $10_{far}$ may be at a significant distance $10_{far}$ from the PCC, while other wind turbines $10_{near}$ may be closer to the PCC. It shall be understood that the wind park 1 may comprise many more wind turbines and only a small selection is shown here for the sake of clarity, and that any number of wind turbines may be connected to the PCC by cables of intermediate length. It shall be understood that any of the wind turbines $10_{far}$, $10_{near}$ shown here can be any of the wind turbines 10_1, ..., 10_n mentioned in the description of the previous diagrams, and each of these may be assumed to comprise a power storage device. Of course, a wind park need only be equipped with a sufficient number of batteries 10S (and a corresponding number of wind turbines) which together can deliver the agreed active power $P_{FR}$ in primary response.

The "remote" wind turbines $10_{far}$ are connected to the PCC by cables with long length $L_{long}$, while the "closer" wind turbines $10_{near}$ are connected to the PCC by cables with comparably short length $L_{short}$. As explained above, power transported through a cable generally undergoes some loss, depending on parameters such as cable length and conductor cross-sectional area. The frequency response module 15 of FIG. 2 is provided with information regarding the cable layout of the wind park, i.e. the cable lengths connecting each wind turbines to the PCC, and distributes the power setpoints SP_1, ..., SP_n to the wind turbines $10_{far}$, $10_{near}$ according to their cable connection lengths $L_{long}$, $L_{short}$ to the PCC. The "closer" wind turbines $10_{near}$ can be curtailed more during normal grid conditions, while the wind turbines $10_{far}$ further away are curtailed less. This "weighted" distribution of power setpoints SP_1, . . . , SP_n effectively minimizes cable losses and also ensures that as much active power as possible can be fed into the grid following an under-frequency event.

Figure 8:
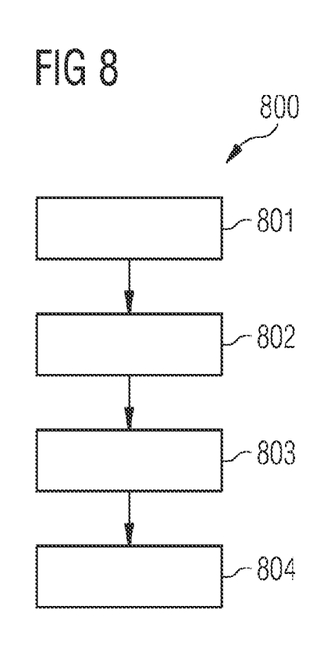
FIG. 8 illustrates a flow chart of a method of operating a wind energy plant according to an example.

FIG. 8 depicts an example of a flow chart of a method 800 of operating a wind energy plant according to any of the examples disclosed.

The actual stored power $P10S_{avail}$ available in the power storage devices 10S_1, . . . , 10S_n may, in block 801, be determined. Then, the active power deficit ΔP10S between the actual stored power P10Savail and the rated storage capacity (P10Srated) of the power storage devices 10S_1, . . . , 10S_n may, in block 802, be computed. The stored power P10Savail from the power storage devices 10S_1, . . . , 10S_n may, in block 803, be fed to the grid. The wind turbines 10_1, . . . , 10_n may, in block 804, be controlled to deliver the active power deficit Δ10S.

Although embodiments of the present invention have been disclosed in the form of embodiments and variations thereon, it will be understood that numerous additional modifications and variations could be made thereto without departing from the scope of embodiments of the invention. For example, the aerodynamic rotor of a variable-speed wind turbine can also be used as an energy storage device, and the kinetic energy stored in the rotor can be released in a brief contribution to frequency response. In an embodiment of the invention, the active power provided by the wind energy plant in response to a grid under-frequency event can be augmented by inertial response if necessary. Again, the release of energy stored in the aerodynamic rotors of one or more wind turbines can be released by issuing appropriate setpoints and commands to those wind turbines.

Furthermore, the batteries of the distributed storage system may be used to respond to an over-frequency event, which occurs when supply outweighs grid demand. Following a grid over-frequency event any partially-charged batteries of the distributed storage system can be fully charged using surplus grid power. The step of charging the batteries can be combined with reducing the active power output by the wind turbines, so that the wind energy plant can quickly reduce its power output faster to respond to the over-frequency event. If the over-frequency event coincides with a low-wind conditions and/or the wind turbines are not producing output power for other reasons, absorption of the surplus power is done by the batteries alone.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind energy plant comprising a plurality of wind turbines and committed to provide a specified quantity of active power over a specified duration in response to a grid under-frequency event,
wherein
a plurality of power storage devices wherein each power storage device is arranged in a wind turbine of the wind energy plant, and is configured to discharge into the grid in response to the grid under-frequency event, and wherein a rated storage capacity of the plurality of power storage devices corresponds to the specified quantity of active power; and
the wind energy plant is configured to deliver an active power deficit when a stored power available in the power storage devices is less than the rated storage capacity at a time of occurrence of the grid under-frequency event.

2. The wind energy plant according to claim 1, comprising a controller configured to curtail an output power of one or more wind turbines based on a discrepancy between an actual storage capacity of the power storage devices and the rated storage capacity of the power storage devices.

3. The wind energy plant according to claim 2, wherein the controller is configured to curtail the output power of a wind turbine on a basis of cable connection length between the wind turbine and a point of common connection of the wind energy plant.

4. The wind energy plant according to claim 1, wherein the rated storage capacity of the plurality of power storage devices is at least as large as the specified quantity of active power.

5. The wind energy plant according to claim 1, wherein each power storage device is configured to be charged by its wind turbine during normal grid conditions.

6. The wind energy plant according to claim 1, wherein a power storage device is a battery.

7. The wind energy plant according to claim 1, comprising a monitoring means configured to monitor charging cycles of the power storage devices of the wind energy plant.

8. A method of operating the wind energy plant according to claim 1, the method comprising:
determining the actual stored power available in the power storage devices;
computing the active power deficit between the actual stored power and the rated storage capacity of the power storage devices;
and subsequently, in response to an under-frequency event:
feeding the stored power from the power storage devices to the grid; and
operating the wind turbines to deliver the active power deficit.

9. The method according to claim 8, wherein the step of operating the wind turbines to deliver the active power deficit comprises a step of generating setpoints to activate spinning reserve from one or more previously curtailed wind turbines.

10. The method according to claim 9, wherein the setpoints are computed on the basis of cable connection lengths of the wind energy plant.

11. A computer program product, comprising a computer readable hardware storage device having computer readable program code stored therein, said program code executable by a processor of a computer system to implement the method according to claim 9 when the computer program product is loaded into a memory of a programmable device.

12. The method according to claim 1, wherein the step of operating the wind turbines to deliver the active power deficit comprises a step of generating control commands to reduce power consumption by auxiliary devices of one or more wind turbines.

13. The method according to claim 1, further comprising a step of monitoring the storage capacity of each power storage device of the wind energy plant.

14. The method according to claim 1, further comprising a step of identifying a storage capacity deficit during a stable grid state.

15. The method according to claim 14, further comprising a step of computing setpoints to curtail one or more wind turbines on a basis of the storage capacity deficit.

* * * * *